United States Patent

Liebetreu et al.

[11] Patent Number: 6,128,282
[45] Date of Patent: Oct. 3, 2000

[54] NETWORK NODE CONTROLLER AND METHOD FOR COMBINING CIRCUIT AND PACKET DATA

[75] Inventors: John M. Liebetreu; Ronald D. McCallister, both of Scottsdale, Ariz.

[73] Assignee: Sicom, Inc., Scottsdale, Ariz.

[21] Appl. No.: 08/994,002

[22] Filed: Dec. 18, 1997

[51] Int. Cl.[7] .............................. H04J 3/24; H04J 3/00; H04L 12/66

[52] U.S. Cl. ................ 370/235; 370/354; 370/478; 370/503; 370/389

[58] Field of Search ................ 370/230, 231, 370/232, 235, 233, 252, 253, 352, 354, 353, 409, 438, 439, 470, 471, 474, 478, 503, 514, 254, 395, 389

[56] References Cited

U.S. PATENT DOCUMENTS

| | | | |
|---|---|---|---|
| 4,893,306 | 1/1990 | Chao et al. | 370/94 |
| 4,939,723 | 7/1990 | Harley, Jr. et al. | 370/84 |
| 4,962,499 | 10/1990 | Sennema | 370/353 |
| 5,062,105 | 10/1991 | McKnight et al. | 370/84 |
| 5,144,623 | 9/1992 | Bernardini | 370/470 |
| 5,251,209 | 10/1993 | Jurkevich et al. | 370/471 |
| 5,381,412 | 1/1995 | Ostani | 370/354 |
| 5,502,723 | 3/1996 | Sanders | 370/60.1 |
| 5,671,223 | 9/1997 | Shachar et al. | 370/471 |
| 5,892,760 | 4/1999 | Athenes et al. | 370/409 |
| 5,923,648 | 7/1999 | Dutta | 370/470 |

*Primary Examiner*—Alpus H. Hsu
*Assistant Examiner*—Afsar M. Qureshi
*Attorney, Agent, or Firm*—Lowell W. Gresham, Esq.; Jordan M. Meschkow, Esq.; Meschkow & Gresham, P.L.C.

[57] ABSTRACT

A node controller (30) within a data communication network (22) provides network access for a digital data stream (32). A processor (42) partitions the digital data stream (32) into a constant data rate component (44) having a predictable data rate and a data packet component (46) having an unpredictable data rate. The constant data rate component (44) is then transferred over a first portion (74) of a network data stream (26) reserved for a circuit transmission protocol, and the data packet component (46) is packetized and transferred over a second portion (76) of the network data stream (26) reserved for a packet transmission protocol.

22 Claims, 4 Drawing Sheets

NETWORK NODE CONTROLLER AND METHOD FOR COMBINING CIRCUIT AND PACKET DATA

TECHNICAL FIELD OF THE INVENTION

The present invention relates generally to the transmission of data in data communication networks and more particularly to a node controller and a method which combines circuit and packet data transmission protocols to provide network access for a digital data stream.

BACKGROUND OF THE INVENTION

There is an ever increasing demand for data communication networks to be capable of efficiently handling vastly different types of data traffic ranging from low speed data and voice to full motion video. Time Division Multiple Access (TDMA) offers a comparably simple, inexpensive solution to the challenge of sharing a common data communication network among multiple users. The efficiency with which TDMA combines multiple data streams is commonly measured by the ratio of the achievable aggregate data rate to the maximum single-user data rate. Thus, TDMA is most efficient if network data is transferred at an effective rate equal to the maximum possible node-to-node transfer rate.

The challenge of TDMA algorithm design is to achieve high transfer efficiency with a minimum of processing complexity/cost, while satisfying the increasingly tight constraints on the transfer of time-sensitive data, such as voice or video. One constraint is that each network link offers a finite data transfer capacity, i.e. a maximum rate at which data can move from one node to the next. Another constraint is that the data traffic generated by individual nodes can vary significantly over time, as each node evolves through multiple modes of operation. Since the rate at which traffic can be transferred between nodes is limited, there may be some aggregate rate of nodal traffic which cannot be accommodated. In an ideal network, this limit would equal the link's maximum data transfer capacity, but in practical networks, efficiency seldom approaches that limit. TDMA efficiency has declined as modern networks have experienced an increase in the number of users (or nodes) exhibiting time-varying data rates. Furthermore, efficiency has declined due to an expansion in the range of data rates which must be multiplexed together, while imposing strict constraints on timing-sensitive data traffic.

One type of TDMA transmission technique utilizes a circuit transmission protocol. In circuit transmission protocol, a network data stream is made up of frames which are subdivided into time slots. Corresponding time slots in each frame are allocated to specific connections between network nodes within a network. For example, one time slot in each frame may be allocated to one specific connection and a second time slot in each frame may be allocated to a second connection, etc. Each frame also includes a time slot which contains transmission overhead information including frame synchronization words and control words. Circuit transmission protocol may also be extended into multiple bit rate services by allocating multiple slots in each frame to high bandwidth services.

Circuit transmission protocol can efficiently transmit data when the data rate is not changing, however, network users are more frequently switching between voice, data, and video services during a single connection or transmitting semi-bursty data generated by compression algorithms. This results in continuously changing data rates and bursty data. Conventional circuit transmission protocols are not effective in this type of environment because the network can only transmit the data at a bit rate determined by the number of slots allocated to the connection. This lack of flexibility results in a loss of data during transmission when the data traffic is exhibiting changing data rates or is bursty.

In contrast with circuit transmission protocols, a packet transmission protocol transmits data in discrete blocks or packets, with each packet having an address header at the front thereof. At network controllers, packets are routed from a specific input line to a specific output line based on address information contained in the packet header. In this way data packets can be routed from a particular subscriber location, through a data communication network, to another subscriber location, and no pre-established connection defines a fixed rate. Thus the packet transmission protocol is suited for wideband data communication services.

A type of packet transmission protocol known as Asynchronous Time Division Multiplexing (ATDM) is particularly suited for use in connection with bursty data traffic. ATDM uses channel identifiers with actual data to allow on-demand multiplexing of data from subscriber terminals. ATDM is bit rate flexible since the appearance of packets can be asynchronous, as in the case of bursty traffic, and can support sharing between voice, video, and data at a variety of transmission rates.

Another type of packet transmission protocol uses a flexible network transport system that is capable of handling both circuit and packet data. This approach combines conventional circuit transmission protocols and packet transmission protocols. To accomplish this, each payload frame of a network data stream can accommodate either a data packet or a time slot from a circuit transmission stream. Before a slot from a circuit transmission stream can be inserted into the payload field, though, it must first be converted into a packet-like form with a header at its front.

The previously discussed packet transmission protocols share a single flaw which can severely constrain network efficiency. In responding to the random character of much of network traffic, packet transmission protocols impose an unnecessary and wasteful overhead on all network traffic thereby decreasing the overall data transfer efficiency of the network.

SUMMARY OF THE INVENTION

Accordingly, it is an advantage of the present invention to provide a node controller and a method within a data communication network for providing network access for a digital data stream.

Another advantage of this invention is to provide a node controller and method that integrates a circuit transmission protocol with a packet transmission protocol to increase data transfer efficiency.

Another advantage of this invention is to provide a node controller and method which increases bit rate flexibility to accommodate a changing data rate of the digital data stream.

Another advantage of this invention is to provide a node controller and method which decreases the overhead information needed during data transmission.

The above and other advantages of the present invention are carried out in one form in a node controller used in a data communication network by a method for providing network access to a digital data stream which has a composite data rate. The method calls for partitioning the digital data stream into a constant data rate component that has a predictable data rate and a data packet component that has an unpredictable data rate. The constant data rate component is transferred over the network using a circuit transmission protocol and the data packet component is transferred over the network using a packet transmission protocol.

In another form, the present invention provides a node controller for use in a data communication network to provide network access for a digital data stream that has a composite data rate. The node controller includes a first in, first out (FIFO) buffer that is responsive to the digital data stream. The FIFO buffer is configured to output data samples at the composite data rate representative of the digital data stream. The node controller also includes a processor that is responsive to the FIFO buffer for partitioning the digital data stream into a constant data rate component and a data packet component. A circuit transmission element is enabled by the processor and is responsive to the constant data rate component. A packet transmission element is enabled by the processor and is responsive to the data packet component. A multiplexer then selectively transfers the constant data rate component and the data packet component into a network data stream on the network.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
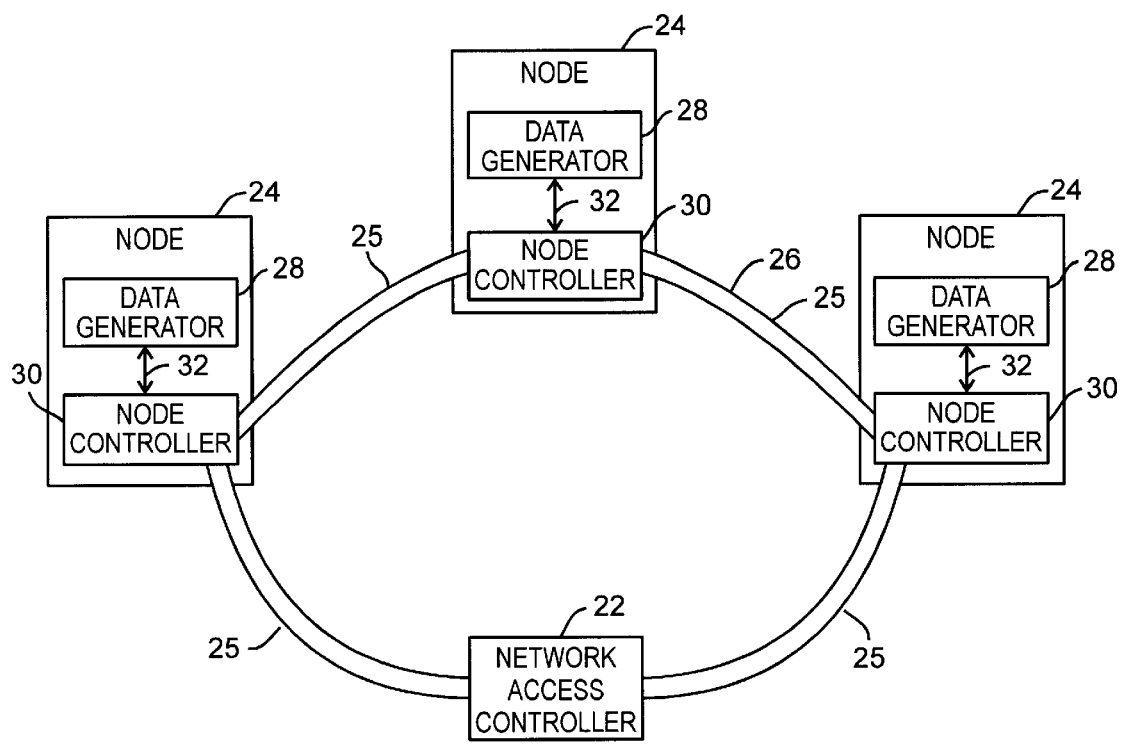
FIG. 1 shows a block diagram of a network that includes a network access controller and a plurality of nodes.

FIG. 1 shows a block diagram of a network 20 that includes a network access controller 22 and a plurality of nodes 24 coupled together through a data communication link medium 25. A network data stream 26 is established on medium 25 to allow network access controller 22 and nodes 24 to communicate with each other. The topology of network 20 (e.g. ring, star, etc.) is not an important parameter of the present invention. Likewise, the nature of medium 25 (e.g. RF, twisted pair, coaxial cable, optical fiber, etc.) is not an important parameter of the present invention.

Each of nodes 24 includes a data generator 28 and a node controller 30. Data generator 28 may be a telephone, a computer, a video teleconferencing unit, or any other device that generates voice, video, data files, or other digital data for transfer over network 20. A digital data stream 32, produced by data generator 28, is multiplexed into network data stream 26 through node controller 30.

Illustratively, data generator 28 may generate a PCM voice digital data stream at 64 Kilobits/sec. Likewise, data generator 28 may be a graphics terminal generating a bursty digital data stream averaging over 1 Megabit/sec, or data may be generated at the DS3 rate of about 45 Megabits/sec. The present invention efficiently processes the illustrated examples as well as other dynamic digital data streams. Those skilled in the art will realize that each of nodes 24 requires bi-directional network access, however for simplicity, only data transfer to network 20 will be described.

In the preferred embodiment, network 20 utilizes a time division multiplexing (TDM) format for multiplexing data samples of digital data streams 32, originating at nodes 24, into consecutive frames (discussed below) of network data stream 26. Network access controller 22 controls the flow of data over network data stream 26 by assigning space within each of the frames of network data stream 26 for specific connections between nodes 24. Network access controller 22 stores information regarding space assignments and specific connections in an internal table (not shown). Network access controller 22 also monitors connections and reassigns space assignments as connections are discontinued or as otherwise needed. Those skilled in the art will recognized that network access controller has other functions, such as maintaining system synchronization, that are not pertinent to understanding the present invention.

Figure 2:
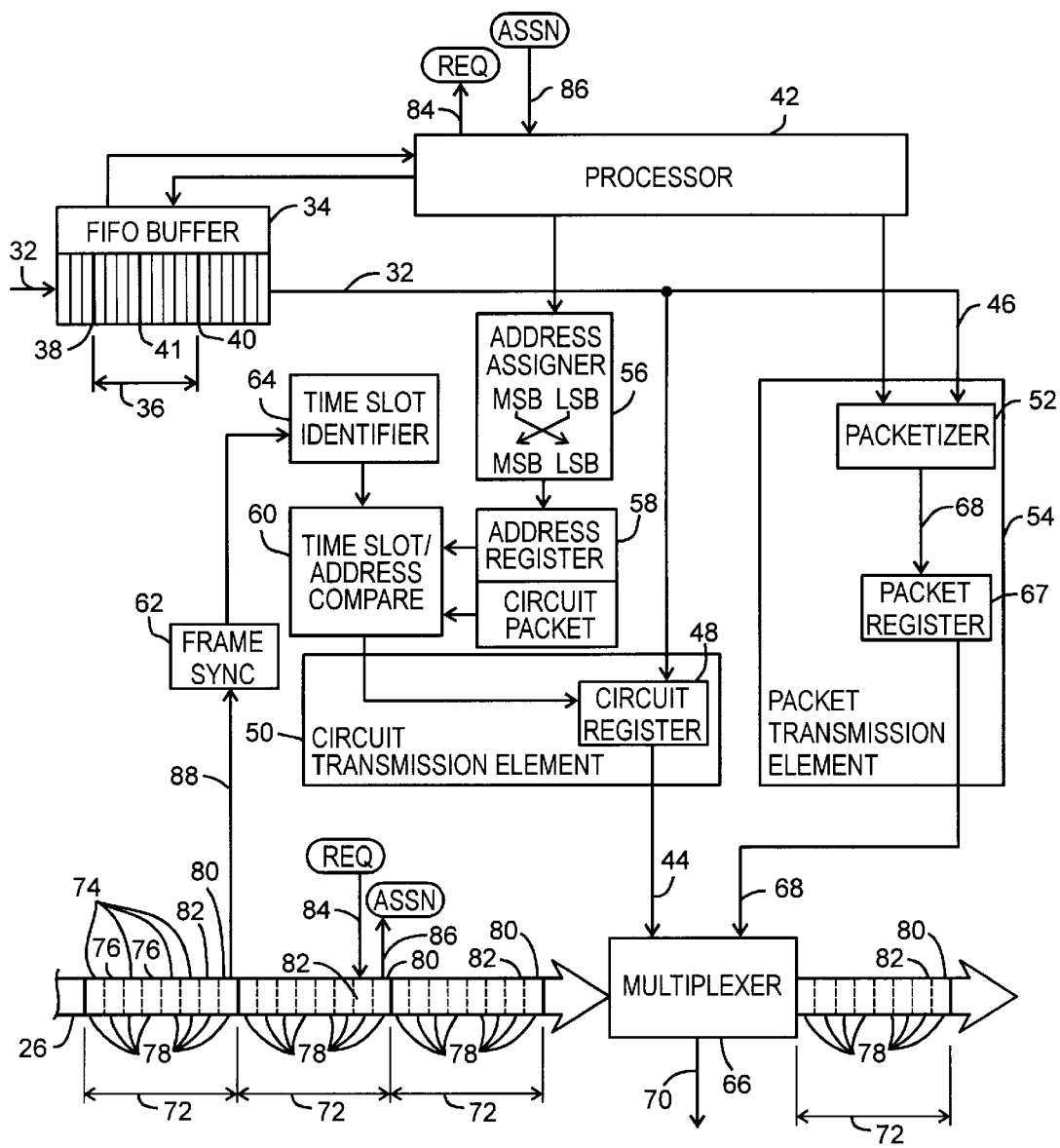
FIG. 2 shows a block diagram of a node controller located at each of the nodes and the timing features of a digital data stream that are applicable to the operation of the node controller.

FIG. 2 shows a block diagram of node controller 30 located at a node 24 and the timing features of network data stream 26 that are applicable to the operation of node controller 30. Digital data stream 32 is being output by data generator 28 (FIG. 1) and is received by a first in, first out (FIFO) buffer 34. FIFO buffer 34 implements a rate threshold window 36 defined by a minimum rate 38 and a maximum rate 40 that are in response to a predictable data rate 41. Predictable data rate 41 describes the rate of a component of digital data stream 32 that has a constant data rate. The constant data rate component (described below) is that part of digital data stream 32 in which the data rate can be inferred based on the node's rate of data generation in the immediately preceding time interval, the type of data being transferred (e.g. voice, compressed video, etc.), and the like. In other words, the data rate of the constant data rate component is predictable based on past history or another predictor. Of course, those skilled in the art will recognize that a data rate may not be constant, but rather will vary slightly above and below predictable data rate 41. Minimum rate 38 and maximum rate 40 are values that define a lower and upper limit of the acceptable variance of predictable data rate 41. Minimum rate 38 and maximum rate 40 also define thresholds in FIFO memory 34. When predictable data rate 41 falls outside of this acceptable variance, or window, node controller 30 will initiate procedures (described below) to accommodate this change in data rate.

FIFO buffer 34 is coupled to a processor 42 and is configured to output, at a composite data rate, data samples that are representative of digital data stream 32. Processor 42, in combination with FIFO buffer 34, form a microprocessor based computer system operating from application specific software programs stored in a computer memory portion (not shown) of processor 42.

At the output from FIFO buffer 34, digital data stream 32 is partitioned into a constant data rate component 44 and a data packet component 46. Constant data rate component 44 is received by a circuit register 48 of a circuit transmission element 50. Data packet component 46 is received by a packetizer 52 of a packet transmission element 54.

Digital data stream 32, constant data rate component 44, data packet component 46, and other signals and data streams described herein are indicated using reference numbers as connections between components where such signals and data streams are present. Those skilled in the art will understand that connections are not such signals and data streams and vice-versa.

Controller 30 also includes an address assigner 56 coupled to processor 42. Address assigner 56 also couples to a circuit and packet address register (ADDRESS REGISTER) 58. Address register 58 couples to a comparator (TIME SLOT/ADDRESS COMPARE) 60. A frame sync element 62 of node controller 30 is coupled to a time slot identifier 64. In turn, time slot identifier 64 is coupled to comparator 60. Comparator 60 is subsequently coupled to circuit register 48. Circuit register 48 outputs constant data rate component 44 to be received by a multiplexer 66 in response to comparison data (described below) from comparator 54.

Packetizer 52 of packet transmission element 54 is coupled to a packet register 67. In addition, comparator 60 is coupled to packet register 67. Packetizer 52 produces data packets 68 which are received by packet register 67. Packet register 67 outputs data packets 68 to multiplexer 66 in response to comparison data (described below) from comparator 54.

Multiplexer 66 receives network data stream 26 and selectively transfers constant data rate component 44 and data packets 68 into network data stream 26 of network 20. Likewise, an arrow 70 indicates that data received at node controller 30 by multiplexer 66 from network data stream 26 is provided in a manner analogous to that described herein for transmitted data.

In the preferred embodiment, network data stream 26 is made up of a plurality of consecutive frames 72. Each of frames 72 is divided into a plurality of time slots 78. Time slots 78 are partitioned into a first portion 74 reserved for the transfer of constant data rate component 44 and a second portion 76 reserved for transfer of data packets 68. Time slots 78 for first and second portions 74 and 76, respectively, are interspersed through each of frames 72.

One time slot 78 in each frame 72 may be assigned as a control channel 80. Control channel 80 is used to convey overhead communications related to controlling network data stream 26 and setting up connections rather than to convey data traffic. In the preferred embodiment, control channel 80 may convey messages which inform nodes 24 of connections being directed to data generators 28, identities of time slots 78 to use for upcoming connections, and the like. Control channel 80 also includes a frame sync word 88 to convey data which indicate the beginning of each frame 72. Frame sync word 88 is decoded in frame sync element 62.

Another time slot 78 in each of frames 72 may be assigned as a request channel 82. Request channel 82 is accessed by processor 42 to place a time slot request (REQ) 84. Time slot request 84 is used to request an estimated number of time slots 78 to be used for a connection being established by node controller 30. Additionally, time slot request 84 includes data which represents an identity of the node making the request. So, control channel 80 provides slot assignments (ASSN) 86 to processor 42 in response to time slot request 84.

Time slot request 84, slot assignments 86, and frame sync word 88 are depicted by arrows in FIG. 2. However, those skilled in the art will understand that these arrows are not connections but rather, the arrows represent processing elements (not shown) that are configured to recognize and process specific information imbedded within said network data stream 26.

First portion 74 and second portion 76 need not be fixed in size or location within frame 72, but rather, network access controller 22 may vary size and location of first portion 74 and second portion 76 based on the activity level and type of data traffic. Additionally, time slots 78, control channel 80, request channel 82, time slot request 84, slot assignments 86, and frame sync word 88 need not have fixed assignments within frame 72.

Figure 3:
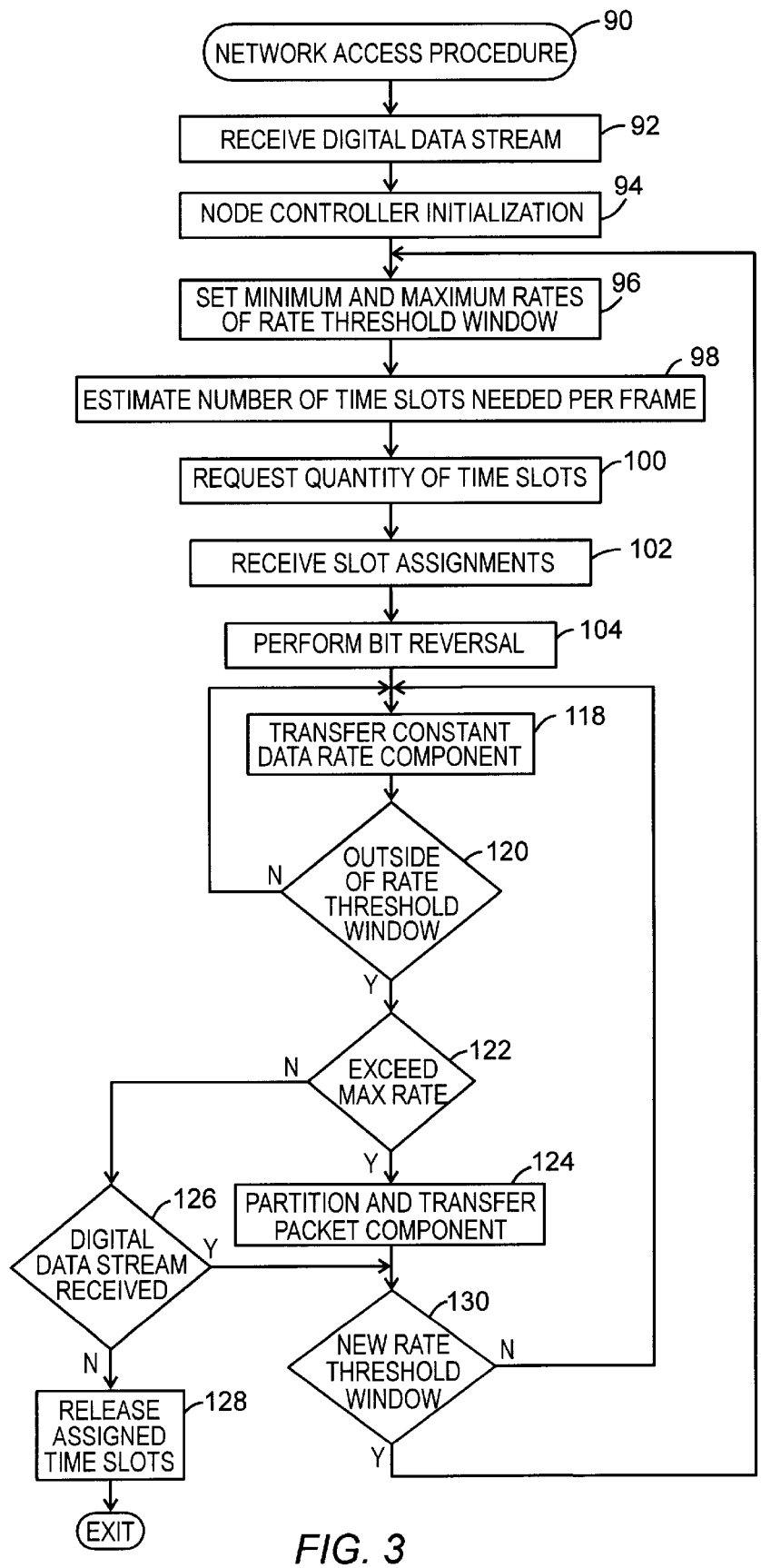
FIG. 3 shows a flow chart of a network access procedure for a digital data stream.

FIG. 3 shows a flow chart of a network access procedure 90 for digital data stream 32 (FIG. 2). Procedure 90 is performed by node controller 30. This discussion concentrates on a single node controller 30 at a single node 24 (FIG. 1), however, those skilled in the art will recognize that more than one of nodes 24 may attempt to communicate substantially concurrently over network data stream 26 (FIG. 1) so that more than one node controller performs procedure 90.

Referring to FIGS. 2 and 3, procedure 90 begins with a task 92 which receives digital data stream 32 into FIFO buffer 34 at a composite data rate. Digital data stream 32 is made up of constant data rate component 44 having a predictable data rate and data packet component 46 having an unpredictable data rate. Thus, the composite data rate is a combination of the predictable and unpredictable data rates.

As previously stated, constant data rate component 44 is that part of digital data stream 32 in which the data rate is predictable based on past history or another predictor. Data packet component 46 is that part of digital data stream 32 in which the data rate is asynchronous and cannot be readily predicted from predictors available to node controller 30. Of course, those skilled in the art will appreciate that for the purposes of the present invention, a data rate is considered to be unpredictable if node controller 30 provides no parameters from which it is easily predicted. An unpredictable data rate may become "predictable" if other parameters are made available or if additional complexity is provided. In short, "unpredictable" is a relative term to be contrasted with "predictable".

In response to receipt of digital data stream 32 in task 92, a task 94 performs initialization of node controller 30. To initialize node controller 30, processor 42 may access past history of data rates produced by node 24, clear circuit and packet registers 48 and 67, respectively, and perform other such housekeeping tasks.

Following task 94, a task 96 establishes minimum rate 38 and maximum rate 40 of rate threshold window 36. Processor 42 may establish the initial values for rate threshold window 36 by predicting predictable data rate 41 based on past history of data rates produced by node 24 (FIG. 1), or by evaluating other parameters, such as data type indicators. However, those skilled in the art will recognize that there are any number of ways to determine rate threshold window 36.

After rate threshold window 36 is established in task 96, a task 98 estimates the number of time slots 78 per frame 72 that are needed to transfer constant data rate component 44. Processor 42 estimates the number of time slots 78 needed based on predictable data rate 41. Task 98 may use a prediction algorithm based on past data rates.

In response to task 98, a task 100 causes processor 42 to place time slot request 84 containing the estimated number of time slots 78 in request channel 82 of network data stream 26. The estimated number of time slots 78 is received by network access controller 22 (FIG. 1). Network access controller 22 receives time slot requests from any nodes within network 20 that are attempting to establish a connection with another node. Network access controller 22 assigns blocks of time slots to specific nodes, reassigns time slots that are no longer needed for a connection, manages time slot assignments for all nodes 24 in network 20, and manages time slot assignments reserved for data packet transfer (i.e. second portion 76). The assignments of blocks of time slots are transmitted back to node controllers 30 in response to requests like those generated in task 100. However, time slot block assignments may be transmitted at any time whether or not a particular node controller 30 requests a particular assignment.

Following task 100, if network access controller 22 (FIG. 1) has the number of requested time slots available in a contiguous block or if other network activities necessitate an address assignment change, a task 102 receives slot assignments 86. In the preferred embodiment, the estimated number of time slots 78 from first portion 74 are assigned as a contiguous block of time slots in slot assignments 86. The size of the block is desirably responsive to predictable data rate 41 of constant data rate component 44. Slot assignments 86 represent a convenient and efficient technique for conveying the assigned time slots 78 without using an undesirable amount of overhead communication.

Figure 4:
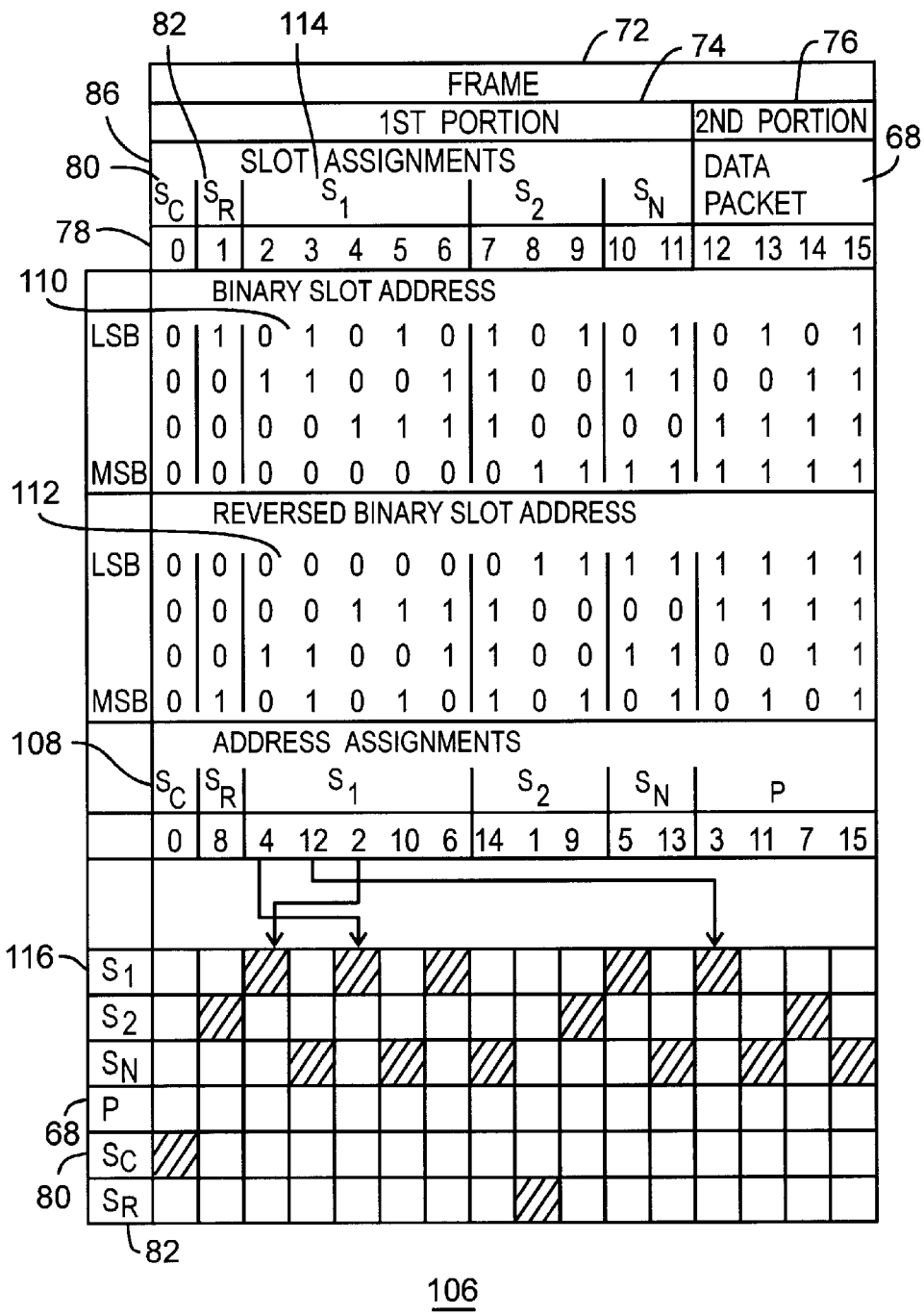
FIG. 4 shows a table of an exemplary allocation of time slots within a frame of a network data stream.

After receipt of slot assignments 86 in task 102, a task 104 performs a bit reversal operation for a circuit transmission protocol. Task 104 can best be understood by referring to FIG. 4. FIG. 4 shows a table 106 of an exemplary allocation of time slots 78 within one of frames 72 of network data stream 26. When processor 42 receives slot assignments 86 from network access controller 22 (FIG. 1), processor 42 enables address assigner 56 to perform task 104.

In table 106, slot assignments 86 describe a temporal arrangement of time slots 78 within frame 72. The bit reversal operation of task 104 is performed by address assigner 56 to convert from slot assignments 86 to address assignments 108. Thus, address assignments 108 for specific time slots 78 are assigned to constant data rate component 44 (FIG. 2) in accordance with slot assignments 86. Likewise, address assigner 56 receives slot assignments 86 for time slots 78 reserved for second portion 76 and performs the bit reversal operation of task 104 to determine address assignments 108 that may be utilized for transfer of data packet 68.

Using slot assignments 86, time slots 78 assigned to constant rate data component 44 are expressed as a contiguous block of time slots in first portion 74. However, through the bit reversal operation of task 104, the contiguous block of time slots 78 is distributed through each of frames 72 and interleaved with time slots 78 assigned to other digital data streams from other nodes 24 (FIG. 1) and with time slots 78 assigned to data packet 68. So, while slot assignments 86 describe a temporal arrangement of time slots 78, address assignments 108 describe time slots 78 that are evenly distributed through each of frames 72 and interleaved with time slots 78 assigned to other connections.

The preferred embodiment uses a bit reversal operation which is easily and inexpensively implemented. In particular, each of slot assignments 86 is associated with a binary slot address 110. Bit reversal is performed by reversing a bit order of each binary slot address 110 (FIG. 4) to produce each reversed binary slot address 112 (FIG. 4). This bit reversal operation is performed to produce address assignments 108 from each reversed binary slot address 112. Most significant bits of binary slot address 110 become least significant bits of reversed binary slot address 112, least significant bits of binary slot address 110 become most significant bits of reversed binary slot address 112, and so on. Address assignments 108 assigned to constant data rate component 44 are then stored in address register 58. Likewise, address assignments 108 for second portion 76 are stored in address register 58.

Referring to the example illustrated by table 106 (FIG. 4), in task 100, processor 42 predicts that five time slots 78 are needed to transfer constant data rate component 44 of digital data stream 32. In task 102, processor 42 receives slot assignments 86 that include a "contiguous" block ($S_1$) of time slots 114 (time slots 2–6). The bit reversal operation of task 104 reverses the bit order of each binary slot address 110 associated with block 114 to produce each reversed binary slot address 112 associated with block 114. The resulting address assignments 108 associated with block 114 are then distributed in a substantially uniform distribution pattern throughout first portion 74 of each frame 72 to form a connection 116. The uniform distribution of time slots throughout each of frames 72 is desirable because it minimizes the amount of memory buffering required in node controller 30.

Further represented in table 106 are one of time slots 78 assigned to control channel 80 ($S_c$) and one of time slots 78 assigned to request channel 82 ($S_r$). Control channel 80 and request channel 82 are also associated with a unique binary slot address 110 which may be reversed to produce reversed binary slot address 112 and subsequently address assignments 108 for control channel 80 and request channel 82. Other time slots 78 ($S_2$) may be assigned to other nodes 24, other time slots 78 ($S_n$) may not be assigned to a node 24, while still other time slots 78 (P) may be reserved for transfer of data packet 68.

The example in table 106 illustrates a time slot assignment technique that optimizes the assigning of time slots for connections. Nodes 24 not engaged in communication over network data stream 26 are assigned no time slots 78. Of the nodes 24 involved in communication, each connection is assigned a quantity of time slots 78 per frame 72 which accommodates predictable data rate 41. Nothing requires different connections to be assigned the same number of time slots 78, and different connections may freely convey data at different data rates.

Referring to FIGS. 2 and 3, following task 104, a task 118 causes processor 42 to enable circuit transmission element 50 and to transfer constant data rate component 44. Frame sync word 88 is decoded in node controller 30 and is routed to frame sync element 62. Frame sync element 62 detects frame sync word 88 in control channel 80 to indicate the beginning of each frame 72. Time slot identifier 64 is synchronized to frame timing by being reset, preset, or cleared at the beginning of each frame 72 in response to the output from frame sync element 62. Following the beginning of each frame 72, time slot identifier 64 increments in synchronism with time slot timing to count or otherwise determine the identities of time slots 78.

Comparator 60 compares the time slot count with address assignments 108 produced during bit reversal operation of task 104. Comparator 60 activates an output representative of constant data rate component 44 from circuit register 48 when a match occurs between the time slot count and one of address assignments 108.

In the preferred embodiment, constant data rate component 44 flows from FIFO buffer 34 into circuit register 48. The bit reversal operation generates address assignments 108 so close to uniform that it is not necessary for circuit register 48 to buffer more than two time slots worth of data while waiting for its next assigned access slot. For high data rate applications, this represents significant memory savings over applications which requires a frame of data to be buffered.

Constant data rate component 44 flows out from circuit register 48 to multiplexer 66 when enabled by comparator 60. Multiplexer 66 then places constant data rate component 44 into time slots associated with address assignments 108 for connection 116 into each frame 72. Thus, constant data rate component 44 is transferred on network data stream 26 only when address assignments 108 for connection 116 occur.

In response to task 118 of procedure 90, a query task 120 identifies when the composite data rate of digital data stream 32 is outside of rate threshold window 36 of FIFO buffer 34. If the composite data rate of digital data stream 32 is approximately equal to predictable data rate 41, FIFO buffer 34 will always be filled to a level responsive to predictable data rate 41 within rate threshold window 36. In that situation, program control loops back to task 118, and node controller 30 continues to transfer constant data rate component 44 using the circuit transmission protocol.

However, if query task 120 determines that the composite data rate of digital data stream 32 is outside of rate threshold window 36, program control proceeds to a query task 122. Query task 122 determines if the composite data rate is exceeding maximum rate 40 of rate threshold window 36.

If the composite data rate is exceeding maximum rate 40, a task 124 is performed. Task 124 causes processor 42 to partition digital data stream 32 by removing a quantity of the oldest bits in FIFO buffer 34, creating data packet component 46, and routing data packet component 46 to packetizer 52 of packet transmission element 54, thus enabling packet transmission element 54. Data packet component 46 is created at irregular times in response to bursty data being transmitted in digital data stream 32 thus resulting in data packet component 46 having an unpredictable data rate.

Packetizer 52 then forms data packets 68 from data packet component 46 that include header information identifying content and destination over network 20. Packetizer 52 employs an asynchronous time division multiplexing technique, however those skilled in the art will recognize that packetizer 52 can implement any of the many open packet transmission protocols for packetized transfer, including Ethernet.

Data packets 68 are then received by packet register 67 where they are retained until comparator 60 determines a match between the time slot count and address assignments 108 for second portion 76 produced during the bit reversal operation of task 104. When a match occurs, comparator 60 determines an availability of address assignments 108 of second portion 76 reserved for the transfer of data packet 68.

When address assignments 108 are available, data packets 68 are output from packet register 67 and received by multiplexer 66. Multiplexer 66 then places data packets 68 into time slots assigned to second portion 76 of frame 72. Two or more node controllers 30 (FIG. 1) may use address assignments 108 from second portion 76. Furthermore, the node controllers 30 may use different packet transfer protocols. Hence, conventional collision detection techniques may be employed to manage interference between nodes 24. So, in contrast with time slots 78 of first portion 74, ownership of time slots 78 of second portion 76 is not dedicated. Rather, time slots 78 of second portion 76 are used on a basis established by the packet transmission protocol.

If query task 120 determines that the composite data rate of digital data stream 32 is outside of rate threshold window 36, but query task 122 determines that the composite data rate is not exceeding maximum rate 40 of rate threshold window 36, then the composite data rate has fallen below minimum rate 38 of rate threshold window 36. In this situation, program control proceeds to a query task 126.

Query task 126 determines if digital data stream 32 is still being received by FIFO buffer 34. Digital data stream 32 may no longer be received when a call is complete or a connection between data generator 28 (FIG. 1) and node controller 30 is otherwise discontinued.

If query task 126 determines that digital data stream 126 is no longer being received, a task 128 is performed to release the assigned time slots 78 of connection 116 (FIG. 4). Node controller 30 may perform task 128 by instructing network access controller 22 to release time slots over request channel 82 of network data stream 26. Network access controller 22 may then break the connection between two nodes 24 (FIG. 1) in network 20 (FIG. 1) by removing assignment information from time slots 78 that were assigned to connection 116. Process 90 is then complete.

In query task 126, if digital data stream 32 is being received by FIFO buffer 34 at a rate lower than minimum rate 38, then program control proceeds to a query task 130. Likewise, following task 124 in which data packets 68 are being transferred in response to digital data stream 32 being received by FIFO buffer 34 at a rate higher than maximum rate 40, then program control proceeds to query task 130.

Query task 130 determines if a second rate threshold window 36 is needed. This decision may be based on a length of time that the composite data rate of digital data stream 32 continues to be outside of rate threshold window 36. In other words, the composite data rate may remain below minimum rate 38 or above maximum rate 40 that define rate threshold window 36 in FIFO buffer 34. When the determination is made that a new rate threshold window 36 is not needed, program control loops back to task 118 to continue transfer of constant data rate component 44 using the circuit transmission protocol.

However, when a determination is made in query task 130 that a second rate threshold window 36 is needed, program control loops back to task 96 to reestablish minimum rate 38 and maximum rate 40 based on an updated predictable data rate 41 for constant data rate component 44 of digital data stream 32. If maximum rate 40 has been exceeded, then an updated predictable data rate is desirably greater than the previously predicted data rate. Likewise, if minimum rate 38 has not been met, then an updated predictable data rate is desirably less than the previously predicted data rate. Additionally, a second number of time slots 78 per frame is predicted and time slots 78 are assigned and received in response to the new predictable data rate for transfer of constant data rate component 44. This dynamic technique provides a method of optimizing slot allocation in the bit reversal circuit transmission protocol.

Network access procedure 90 may be performed independently at more than one node controller 30. A first node controller may receive a digital data stream that has a predictable data rate from a first data generator. A second node controller may receive a digital data stream that has a different predictable data rate from a second data generator. The first and second node controllers can then estimate a number of time slots needed to transfer the data streams on network data stream 26. Network access controller 22 (FIG. 1) will then assign the number of slots requested to each of the first and second node controllers. The number of time slots does not have to be the same for each of the node controllers. Rather, the number of time slots assigned to each of the node controllers is dependent on the predictable data rate of the digital data stream being received at each of the node controllers.

In summary, the present invention provides a node controller and a method within a data communication network for providing network access for a digital data stream. Furthermore, this invention integrates a circuit transmission protocol with a packet transmission protocol to increase data transfer efficiency. Data transfer efficiency is further enhanced by increasing bit rate flexibility to accommodate changing data rates of digital data streams while decreasing overhead information needed during data transmission.

Although the preferred embodiments of the invention have been illustrated and described in detail, it will be readily apparent to those skilled in the art that various modifications may be made therein without departing from the spirit of the invention or from the scope of the appended claims. For example, the present invention was described in accordance with a specific circuit transmission protocol, however other transmission protocols may be adapted to this application.

What is claimed is:

1. In a node controller within a data communication network, said node controller including a first in, first out (FIFO) buffer for receiving a digital data stream and a processor responsive to said FIFO buffer, said digital data stream having a composite data rate, a method for providing network access to said digital data stream, said method comprising the steps of:

(a) outputting data samples representative of said digital data stream from said FIFO buffer;

(b) partitioning said data samples into a constant data rate component having a predictable data rate and a data packet component having an unpredictable data rate, said partitioning step being performed by said processor;

(c) forming data packets from said data packet component of said data samples;

(d) transferring said constant data rate component over said network using a circuit transmission protocol; and (e) transferring said data packets over said network using a packet transmission protocol.

2. A method as claimed in claim 1 wherein said step (b) further comprises the steps of:

predicting said predictable data rate; and establishing a minimum rate and a maximum rate for a rate threshold window, said minimum and maximum rates being responsive to said predictable data rate.

3. A method as claimed in claim 2 wherein said steps (c) and (e) occur when said composite data rate exceeds said maximum rate.

4. A method as claimed in claim 2 wherein said step (b) further comprises the steps of:

identifying when said composite data rate appears to be outside of said rate threshold window; and reestablishing said minimum and maximum rates to form a second rate threshold window when said composite data rate appears to be outside of said rate threshold window.

5. A method as claimed in claim 1 wherein:

said network utilizes a time division multiplexing (TDM) format for multiplexing said data samples representative of said digital data stream into consecutive frames of a network data stream;

a first portion of said frame is reserved for transfer of said constant data rate component;

a second portion of said frame is reserved for transfer of said data packets;

said step (d) transfers said constant data rate component using said first portion; and said step (e) transfers said data packets using said second portion.

6. A method as claimed in claim 5 wherein said first portion comprises a plurality of time slots having slot assignments, and said step (b) comprises the steps of:

estimating a number of time slots per frame for transfer of said constant data rate component; and receiving said slot assignments responsive to said estimated number of time slots.

7. A method as claimed in claim 6 wherein:

each of said slot assignments has a binary slot address; and said step (d) further comprises the step of reversing bit order of said binary slot address for each of said slot assignments to produce address assignments.

8. A method as claimed in claim 6 wherein said step (b) further comprises the steps of:

predicting a second number of time slots per frame for transfer of said constant data rate component; and receiving new slot assignments responsive to said predicting step.

9. A method as claimed in claim 5 wherein said second portion comprises a plurality of time slots having slot assignments, each of said slot assignments has a binary slot address, and said method further comprises the steps of:

reversing bit order of said binary slot address for each of said slot assignments to produce address assignments;

determining availability of said time slots associated with said address assignments prior to said step (e).

10. A method as claimed in claim 1 wherein said packet transmission protocol employs an asynchronous time division multiplexing technique.

11. A node controller for use within a data communication network to provide network access for a digital data stream having a composite data rate, said node controller comprising:

a first in, first out (FIFO) buffer for receiving said digital data stream, said FIFO buffer being configured to output data samples representative of said digital data stream at said composite data rate;

a processor responsive to said FIFO buffer for partitioning said data samples representative of said digital data stream into a constant data rate component and a data packet component;

a circuit transmission element enabled by said processor and responsive to said constant data rate component;

a packet transmission element enabled by said processor for forming data packets from said data packet component in response to receipt of said data packet component from said FIFO buffer; and a multiplexer for selectively transferring said constant data rate component and said data packets into a network data stream on said network.

12. A node controller as claimed in claim 11 wherein:

said constant data rate component exhibits a predictable data rate;

said FIFO buffer includes a rate threshold window, said rate threshold window having a minimum rate and a maximum rate responsive to said predictable data rate; and said processor is configured to cause said FIFO buffer to output said data packets to said packet transmission element when said composite data rate exceeds said maximum rate value.

13. A node controller as claimed in claim 12 wherein:

said processor is configured to identify when said composite data rate appears to be outside of said rate threshold window; and said processor reestablishes said minimum and maximum rates to form a second rate threshold window when said composite data rate appears to be outside of said rate threshold window.

14. A node controller as claimed in claim 11 wherein:

said network utilizes a time division multiplexing (TDM) format for multiplexing data samples of said digital data stream into consecutive frames of said network data stream;

a first portion of each frame is reserved for transfer of said constant data rate component, said first portion being comprised of a plurality of time slots; and said processor is configured to estimate a number of time slots to transfer said constant data rate component.

15. A node controller as claimed in claim 14 wherein:

each of said frames includes a request channel assigned to one of said time slots; and said processor is further configured to access said request channel to request said estimated number of time slots.

16. A node controller as claimed in claim 14 wherein:

each of said frames includes a control channel assigned to one of said time slots; and said processor is further configured to access said control channel to receive slot assignments responsive to said estimated number of time slots, each of said slot assignments having a binary slot address.

17. A node controller as claimed in claim 16 wherein said control channel includes a frame sync word, and said node controller further comprises a frame sync element responsive to said frame sync word.

18. A node controller as claimed in claim 17 wherein said binary slot address is associated with a first bit order, and said controller further comprises:

a time slot identifier coupled to said frame sync element and configured to identify one of said time slots in response to said frame sync word;

an address assigner coupled to said processor and configured to reverse said first bit order of said binary slot address to produce a first reversed bit order;

an address register coupled to said address assigner and configured to store an address assignment responsive to said first reversed bit order;

a comparator coupled to said time slot identifier and said address register and configured to compare said one timeslot to said address assignment; wherein said circuit transmission element includes a circuit register coupled to said comparator, said circuit register being configured to receive said data samples from said FIFO buffer and output said data samples in response to a match between said one time slot and said address assignment.

19. A node controller as claimed in claim 14 wherein:

said plurality of time slots is a first plurality of time slots;

a second portion of each frame of said network data stream is reserved for transfer of said data packet component, said second portion being comprised of a second plurality of time slots;

said packet transmission element includes an asynchronous packetizer coupled to said FIFO buffer to form said data packets; and said packet transmission element includes a packet register configured to receive said data packets and output said data packets in response to an availability of said second plurality of time slots.

20. A node controller as claimed in claim 11 wherein:

said network utilizes a time division multiplexing (TDM) format for multiplexing data samples of said digital data stream into consecutive frames of said network data stream;

a first portion of each frame is reserved for transfer of said constant data rate component;

said multiplexer is configured to place said constant data rate component into said first portion.

21. A node controller as claimed in claim 20 wherein:

a second portion of each frame is reserved for transfer of said data packets; and said multiplexer is further configured to place said data packets into said second portion.

22. In a data communication network utilizing a time division multiplexing (TDM) format for multiplexing data samples from a plurality of digital data streams into consecutive frames of a network data stream, said data communication network including a first processor responsive to a first in, first out (FIFO) buffer and a second processor responsive to a second FIFO buffer, and each of said frames comprising a plurality of time slots, a method for providing network access for a first digital data stream received at said FIFO buffer and a second digital data stream received at said second FIFO buffer, said method comprising the steps of:

(a) outputting first data samples representative of said first digital data stream from said FIFO buffer;

(b) outputting second data samples representative of said second digital data stream from said second FIFO buffer;

(c) partitioning said first data samples into a first constant data rate component having a first predictable data rate and a first data packet component having a first unpredictable data rate, said step (c) being performed by said first processor;

(d) partitioning said second data samples into a second constant data rate component having a second predictable data rate and a second data packet component having a second unpredictable data rate, said step (d) being performed by said second processor, and said first and second predictable data rates differing from each other;

(e) estimating a first number of said time slots needed for transferring said first constant data rate component;

(f) estimating a second number of said time slots needed for transferring said second constant data rate component, said second number differing from said first number;

(g) transferring said first and second constant data rate components over said network using said first and second numbers of time slots, respectively, and a circuit transmission protocol;

(h) forming first data packets from said first data packet component in response to said first unpredictable data rate;

(i) forming second data packets from said second data packet component in response to said second unpredictable data rate; and (j) transferring said first and second data packets over said network using an asynchronous packet transmission protocol.

* * * * *

UNITED STATES PATENT AND TRADEMARK OFFICE
CERTIFICATE OF CORRECTION

PATENT NO : 6,128,282
DATED : 3 October 2000
INVENTOR(S): Liebetreu, et al.

It is certified that error appears in the above-identified patent and that said Letters Patent is hereby corrected as shown below:

In column 12, line 65 (claim 12) insert the word --component-- after the word "packets" and before the word "to"

Signed and Sealed this

Eighth Day of May, 2001

Attest:

NICHOLAS P. GODICI

Attesting Officer

Acting Director of the United States Patent and Trademark Office